US008116206B1

(12) United States Patent
Dropps et al.

(10) Patent No.: US 8,116,206 B1
(45) Date of Patent: Feb. 14, 2012

(54) METHOD AND SYSTEM FOR ROUTING FRAMES IN A NETWORK (75) Inventors: Frank R. Dropps, Maple Grove, MN (US); Gary M. Papenfuss, St. Paul, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 92 days.

(21) Appl. No.: 12/037,847

(22) Filed: Feb. 26, 2008

(51) Int. Cl.
*G06F 15/173* (2006.01)
(52) U.S. Cl. .................. 370/238; 370/392; 709/213
(58) Field of Classification Search .................. None
See application file for complete search history.

(56) References Cited

U.S. PATENT DOCUMENTS

| 6,226,685 | B1 * | 5/2001 | Chen et al. | 709/238 |
| 6,938,097 | B1 * | 8/2005 | Vincent et al. | 709/240 |
| 2002/0161848 | A1 * | 10/2002 | Willman et al. | 709/213 |
| 2004/0151175 | A1 * | 8/2004 | Moll et al. | 370/389 |
| 2007/0019648 | A1 * | 1/2007 | Robinson et al. | 370/392 |

* cited by examiner

*Primary Examiner* — Chirag Shah
*Assistant Examiner* — Steve Young
(74) *Attorney, Agent, or Firm* — Klein, O'Neill & Singh, LLP (57) ABSTRACT

A method for routing frames is provided. The method comprises: receiving a frame at a receive port segment of a port for a switch element; generating a tag based on information included in the frame, where the tag identifies a location where the frame is stored in the receive port segment; transmitting the tag to a destination port for the frame; generating a request for the frame, wherein the destination port generates the request for the frame; transmitting the request for the frame to the port that received the frame, where a field in the request differentiates the request for the frame from the tag generated by the receive port segment of the port that received the frame; and transmitting the frame stored at the receive port segment, in response to the request sent by the destination port.

15 Claims, 8 Drawing Sheets

METHOD AND SYSTEM FOR ROUTING FRAMES IN A NETWORK

BACKGROUND

1. Technical Field

The present disclosure relates to networks, and more particularly, to routing frames in a storage area network.

2. Related Art

Networks typically use frames or packets (used interchangeably through out this specification) to send information (or data) between network nodes. A network node is a port for a network device (for example, a switch, host bus adapter and others). A network node that transmits a frame may be designated as a "transmitting node" and a network node that receives a frame may be designated as a "receiving node"

Typically, when a receiving node receives a frame, the frame is stored (or staged) in a receive buffer (or memory storage space). The receiving node makes a routing decision to send the frame to its destination based on the local conditions affecting the receive node. The receiving node is not aware of other receiving nodes that may be trying to use the same transmit resources to send a frame. If two or more receiving nodes are trying to use the same transmit node, oversubscription will occur leading to congestion and a reduction in the overall network bandwidth.

Therefore, there is a need for a system and method for routing frames in a network or a multi level switch.

SUMMARY

A method for routing frames is provided. The method comprises: receiving a frame at a receive port segment of a port for a switch element; generating a tag based on information included in the frame, where the tag identifies a location where the frame is stored in the receive port segment; transmitting the tag to a destination port for the frame; generating a request for the frame, where the destination port generates the request for the frame; transmitting the request for the frame to the port that received the frame, where a field in the request differentiates the request for the frame from the tag generated by the receive port segment of the port that received the frame; and transmitting the frame stored at the receive port segment, in response to the request sent by the destination port.

A network system is provided. The network system comprises: a first switch element including at least one port having a receive segment and a transmit segment, where the receive segment for the port receives a frame; a second switch element with at least one port having a receive segment and a transmit segment; where the port for the second switch element is a destination for the frame received by the first switch element port; where the first switch element port generates a tag based on information included in the frame, where the tag identifies a location where the frame is stored in the receive port segment; and the transmit segment of the port for the first switch element transmits the tag to the destination port at the second switch element; and wherein the second switch element port generates a request for the frame, and transmits the request for the frame to the first switch element port, where a field in the request differentiates the request for the frame from the tag generated by the first switch element port; and in response to the request, the first switch element port transmits the frame stored at the receive port segment of the first switch element.

A first network switch element is provided. The first network switch element comprises: at least one port having a receive segment and a transmit segment, where the receive segment for the port receives a frame; and a tag writer for the first switch element port generates a tag based on information included in the frame, the tag identifying a location where the frame is stored in the receive port segment; and the transmit segment of the port for the first switch element transmits the tag to a destination port at a second switch element; wherein the second switch element port generates a request for the frame, and transmits the request for the frame to the first switch element port, where a field in the request differentiates the request for the frame from the tag generated by the first switch element port; and in response to the request, the first switch element port transmits the frame stored at the receive port segment of the first switch element.

This brief summary has been provided so that the nature of the disclosure may be understood quickly. A more complete understanding of the disclosure can be obtained by reference to the following detailed description of the preferred embodiments thereof concerning the attached drawings.

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures.

DETAILED DESCRIPTION

Definitions

The following definitions are provided as they are typically (but not exclusively) used in the Fibre Channel environment, implementing the various adaptive aspects of the present disclosure "Fibre Channel ANSI Standard": The standard (incorporated herein by reference in its entirety) describes the physical interface, transmission and signaling protocol of a high performance serial link for support of other high level protocols associated with IPI, SCSI, IP, ATM and others.

"Fabric": The structure or organization of a group of switches, target and host devices (NL_Port, N_ports etc.).

"FIFO": A first in first out buffer structure used for storing information.

"Port": A general reference to N. Sub.--Port or F.Sub.--Port.

"Switch": A fabric element conforming to the Fibre Channel Switch standards.

"Tag": A collection of information that identifies a unique data frame.

To facilitate an understanding of the various embodiments, the general architecture and operation of a network system/network switch is described. The specific architecture and operation of the preferred embodiment will then be described with reference to the general architecture.

Storage area networking systems may use standard or proprietary protocols, or a combination of protocols for enabling communication, for example, Fibre Channel, Infiniband ("IB"), Ethernet, Fibre Channel Over Ethernet (FCoE) or any other standard. These standards are incorporated herein by reference in their entirety. The following examples are based on Fibre Channel standards; however the adaptive aspects described herein are not limited to any particular standard or protocol.

Fibre Channel is a set of American National Standard Institute (ANSI) standards, which provide a serial transmission protocol for storage and network protocols such as HIPPI, SCSI, IF, ATM and others. Fibre Channel provides an input/output interface to meet the requirements of both channel and network users.

Fibre Channel supports three different topologies: point-to-point, arbitrated loop and Fibre Channel fabric. The point-to-point topology attaches two devices directly. The arbitrated loop topology attaches devices in a loop. The Fibre Channel fabric topology attaches host systems directly to a fabric, which are then connected to multiple devices. The Fibre Channel fabric topology allows several media types to be interconnected.

Fibre Channel fabric devices include a node port or "N_Port" that manages fabric connections. The N_port establishes a connection to a fabric element (e.g., a switch) having a fabric port or "F_port". Fabric devices may also support expansion ports (E_Ports) between switching elements.

A Fibre Channel switch is a multi-port device where each port manages a point-to-point connection between itself and its attached system. Each port can be attached to a server, peripheral, I/O (input/output) subsystem, bridge, hub, router, or even another switch. A switch receives messages from one port and routes it to another port.

Figure 1A:
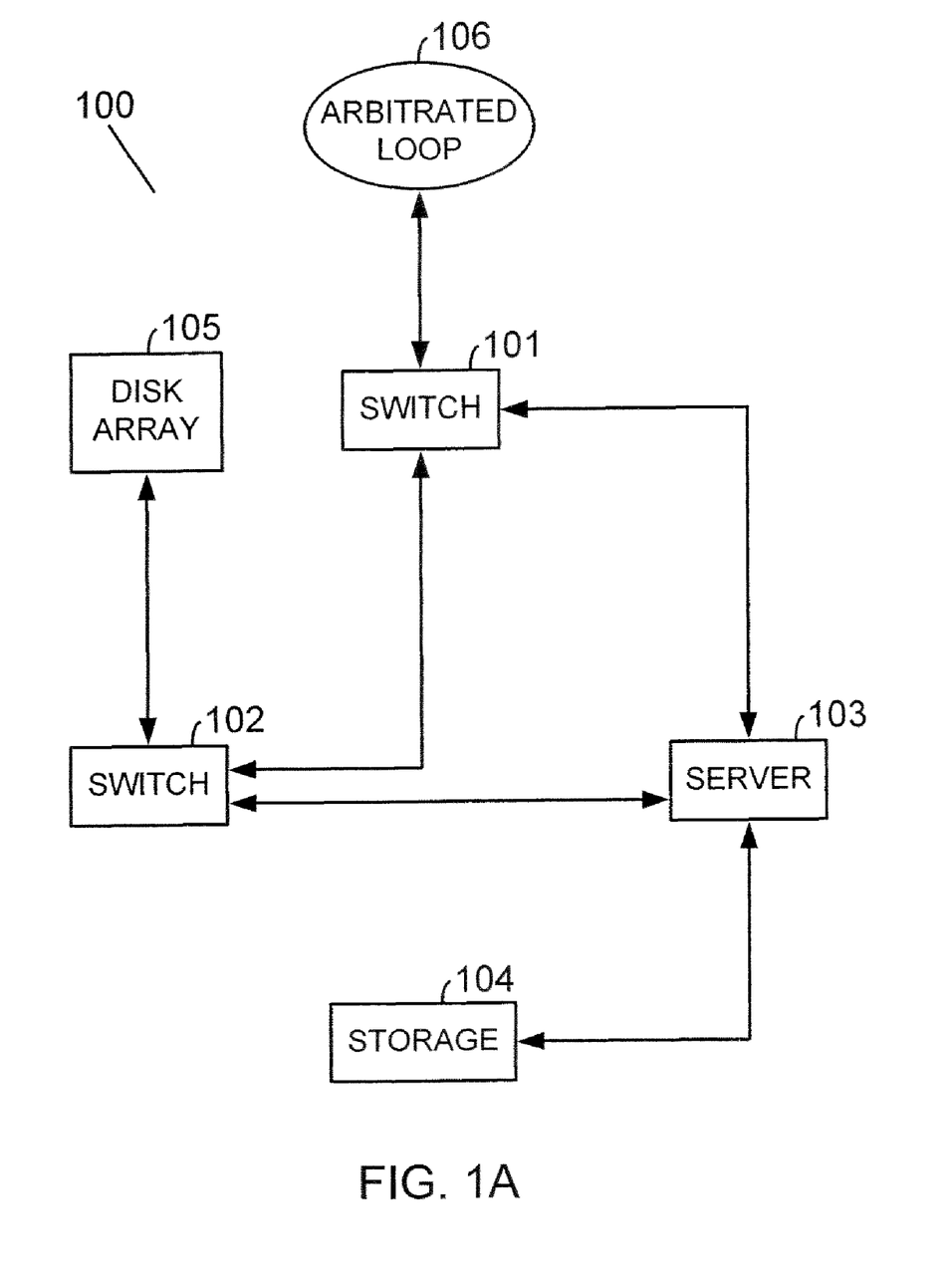
FIG. 1A shows an example of a network system, used according to one embodiment of the present disclosure.

Network System:

FIG. 1A is a block diagram of a network system 100 implementing the methods and systems in accordance with the various embodiments disclosed herein. Network system 100 may be based on Fibre Channel, IB, or any other protocol. The examples below are described with respect to Fibre Channel but are applicable to Fibre Channel or any other standard.

System 100 includes plural devices that are interconnected. Each device includes one or more ports, classified as for example, node ports (N_Ports), fabric ports (F_Ports), and expansion ports (E_Ports) Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N_Port in server 103 may establish a path with disk array 105 through switch 102.

Figure 1B:
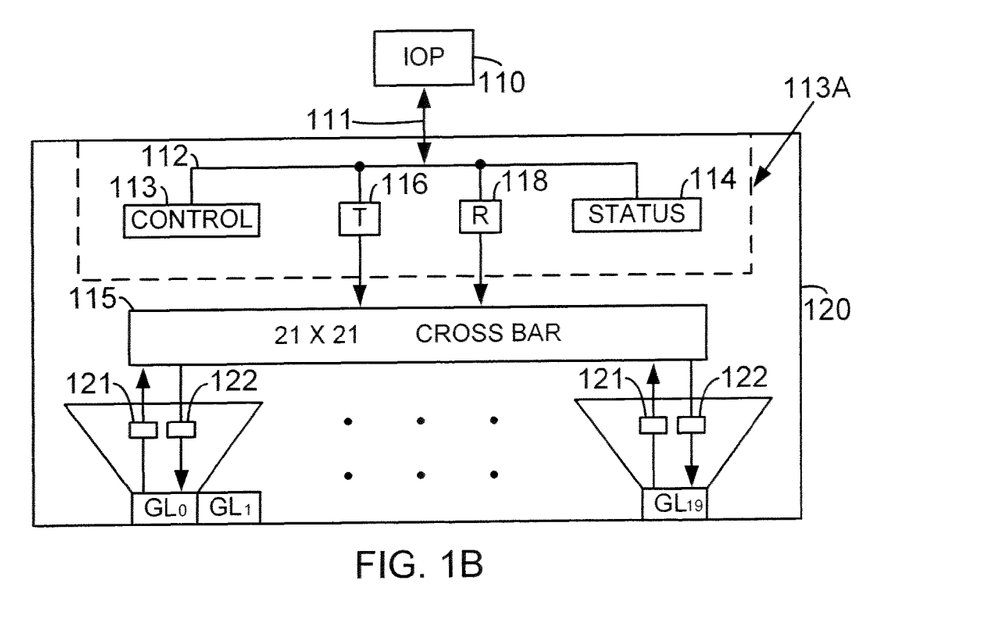
FIG. 1B shows an example of a Fibre Channel switch element, according to one embodiment of the present disclosure.

FIG. 1B is a block diagram of a 20-port ASIC (Application Specific integrated Circuit) Fabric switch element, used according to one embodiment. FIG. 1B provides the general architecture of a 20 channel switch chassis using the 20-port Fabric element. Fabric element includes ASIC 120 that supports non-blocking Fibre Channel class 2 (connectionless, acknowledged) service and class 3 (connectionless, unacknowledged) service between any ports. It is noteworthy that ASIC 120 may also be designed for class 1 (connection-oriented) service, within the scope and operation of the present embodiment as described herein.

The Fabric element of the present disclosure is presently implemented as a single CMOS ASIC, and for this reason the term "Fabric element" and ASIC are used interchangeably to refer to the preferred embodiments in this specification. Although FIG. 1B shows 20 ports, the present disclosure is not limited to any particular number of ports.

ASIC 120 has 20 ports numbered in FIG. 1B as GL0 through GL19. These ports are generic to common Fibre Channel port types, for example, F_Port, FL_Port and E_Port. In other words, depending upon what it is attached to, each generic port (also referred to as GL Port) can function as any type of port. Also, the GL port may function as a special port useful in fabric element linking, as described below.

For illustration purposes only, all GL ports are drawn on the same side of ASIC 120 in FIG. 1B. However, the ports may be located on both sides of ASIC 120 as shown in other Figures. This does not imply any difference in port or ASIC design. Actual physical layout of the ports will depend on the physical layout of the ASIC.

Each port GL0-GL19 includes transmit and receive connections to switch crossbar 115. Within each port, one connection is through receive buffer 121, which functions to receive and temporarily hold a frame during a routing operation. The other connection is through transmit buffer 122.

Switch crossbar 115 includes a number of switch crossbars for handling specific types of data and data flow control information. For illustration purposes only, switch crossbar 115 is shown as a single crossbar. Switch crossbar 115 is a connectionless crossbar (packet switch) of known conventional design, sized to connect 21×21 paths. This is to accommodate 20 GL ports plus a port for connection to a fabric controller, which may be external to ASIC 120.

In one embodiment, the switch chassis described herein, the Fabric controller is a firmware-programmed microprocessor, also referred to as the input/output processor ("IOP"). As seen in FIG. 1B, bi-directional connection to IOP 110 is routed through port 111, which connects internally to a control bus 112. Transmit buffer ("T") 116, receive buffer ("R") 118, control register 113 and Status register 114 (within block 113A) connect to bus 112. Transmit buffer 116 and receive buffer 118 connect the internal connectionless switch crossbar 115 to IOP 110 so that it can source or sink frames.

Control register 113 receives and holds control information from IOP 110, so that IOP 110 can change characteristics or operating configuration of ASIC 120 by placing certain control words in register 113. IOP 110 can read status of ASIC 120 by monitoring various codes that are placed in status register 114 by monitoring circuits (not shown).

Figure 1C:
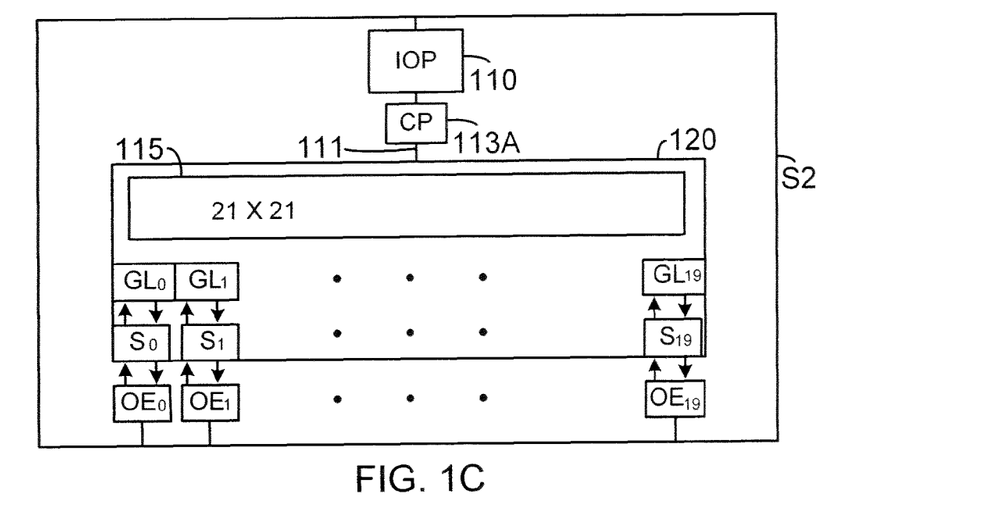
FIG. 1C shows a block diagram of a 20-channel switch chassis, according to one embodiment of the present disclosure.

FIG. 1C shows a 20-channel switch chassis S2 using ASIC 120 and IOP 110. IOP 110 in FIG. 1C is shown as a part of a switch chassis utilizing one or more of ASIC 120. S2 also includes other elements, for example, a power supply (not shown). The 20 GL_Ports correspond to channels (also referred to as "C") C0-C19.

Each GL_Port has a serial/deserializer (SERDES) (also referred to as "S") designated as S0-S19. Ideally, the SERDES functions are implemented on ASIC 120 for efficiency, but may alternatively be external to each GL_Port. The SERDES converts parallel data into a serial data stream for transmission and converts received serial data into parallel data.

Each GL_Port may have an optical-electric converter, designated as (also referred to as "OE") OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
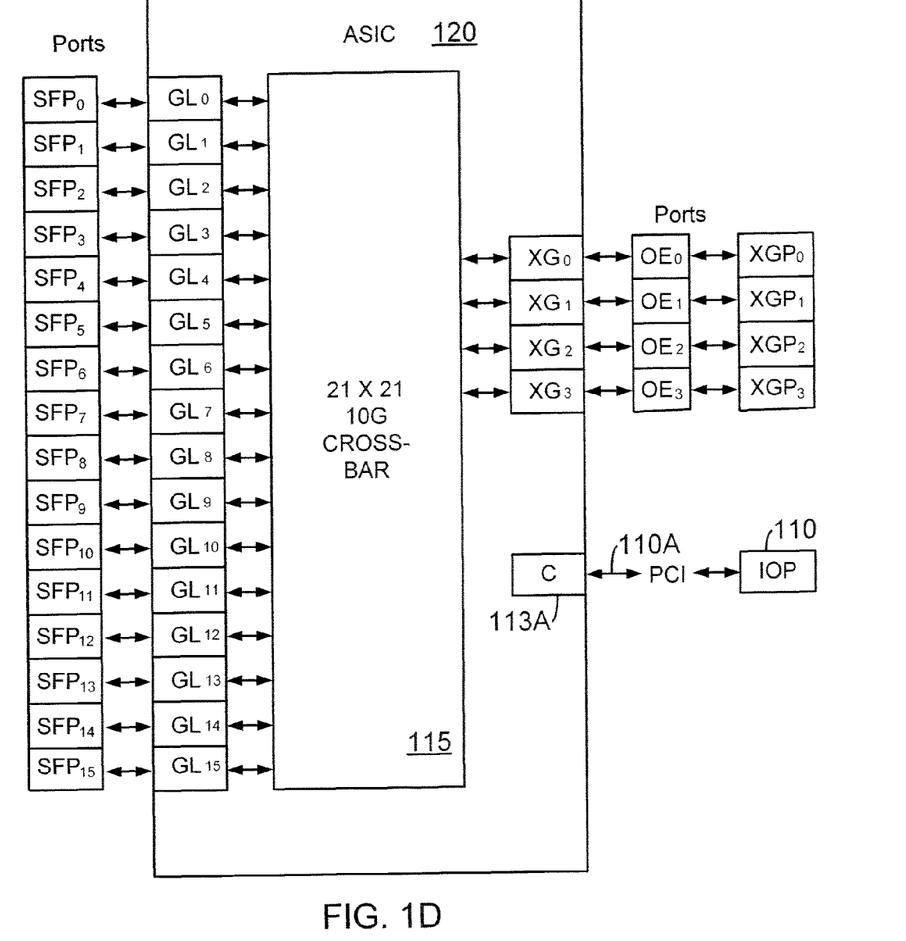
FIGS. 1D and 1E shows block diagrams of a Fibre Channel switch element, according to one embodiment of the present disclosure.

FIG. 1D shows a block diagram of ASIC 120 with sixteen GL ports and four high speed (for example, 10 Gb) port control modules designated as XG0-XG3 for four high-speed ports designated as XGP0-XGP3. GL ports ($GL_0$-$GL_{15}$) communicate with 1 g/2 g SFP Port modules $SFP_0$-$SFP_{15}$. SFP is a small form factor pluggable optical transceiver. ASIC 120 include a control port 113A (that includes control register 113) that is coupled to IOP 110 through a PCI connection 110A.

FIGS. 1E(i)/E(ii) (jointly referred to as FIG. 1E) show yet another block diagram of ASIC 120 with sixteen GL and four XG port control modules. Each GL port control module has a receive port (or a receive segment) (RPORT) 132 with a receive buffer (RBUF) 132A (similar to 121, FIG. 1B) and a transmit port (or a transmit segment) 130 with a transmit buffer (TBUF) 130A (similar to 122, FIG. 1B). GL and XG port control modules are coupled to physical media devices ("PMD") 134 and 135 respectively.

Control port module 113A includes control buffers 113B and 113D for transmit and receive sides, respectively. Module 113A also includes a PCI interface module 113C that interfaces with IOP 110 via a PCI bus 110A. It is noteworthy that the present disclosure is not limited the PCI bus standard, any other protocol/standard may be used to interface control port 113A components with IOP 110.

XG_Port (for example 136) includes RPORT 138A with RBUF 138 similar to RPORT 132 and RBUF 132A and a TBUF 137 and TPORT 137A similar to TBUF 130A and TPORT 130. Protocol module 139 interfaces with SERDES to handle protocol based functionality.

Incoming frames are received by RPORT 132 via SERDES 131 and then transmitted using TPORT 130. Buffers (RBUF) 132A and (TBUF) 130A are used to stage frames in receive and transmit paths.

Figure 1E:
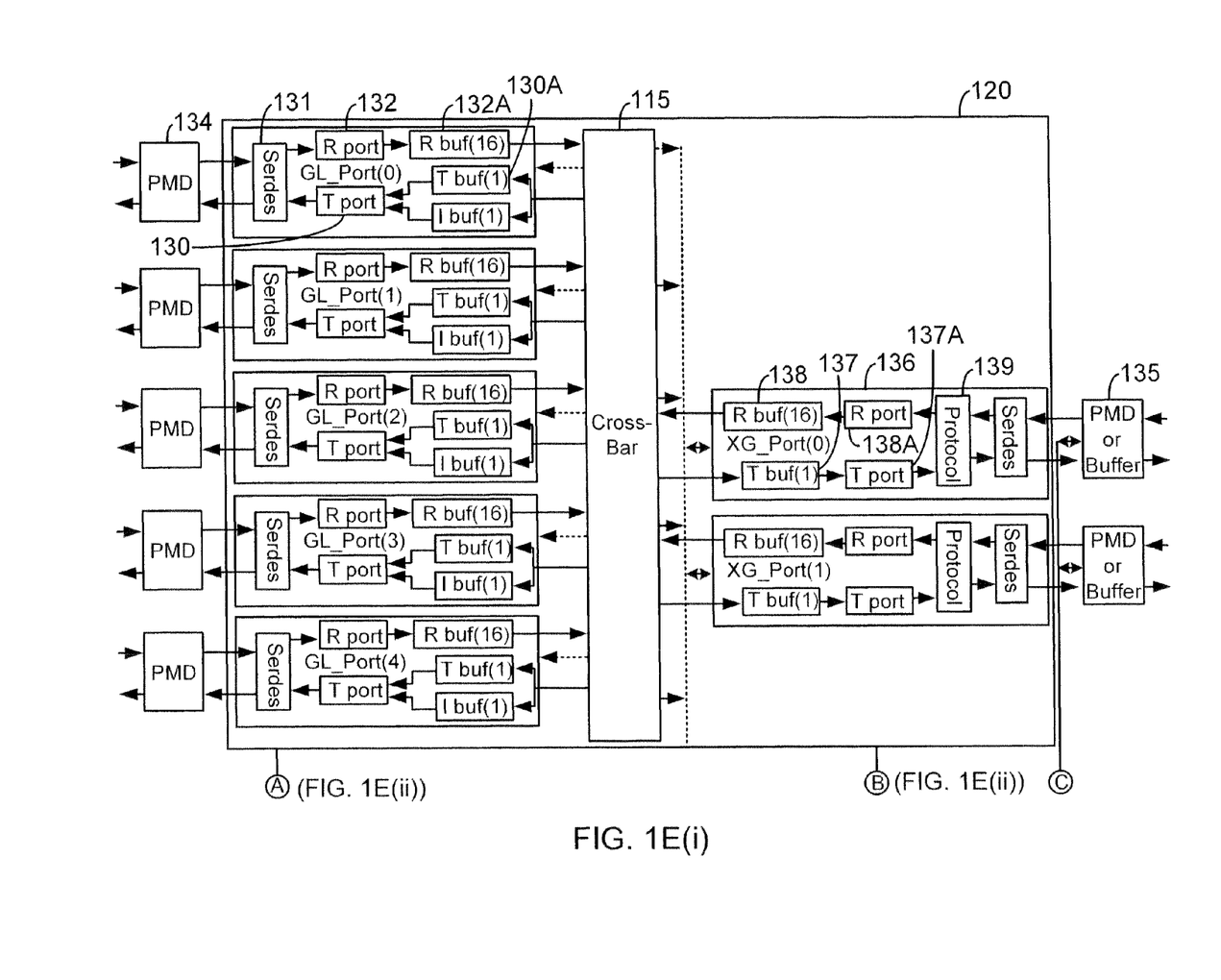
Figure 1F:
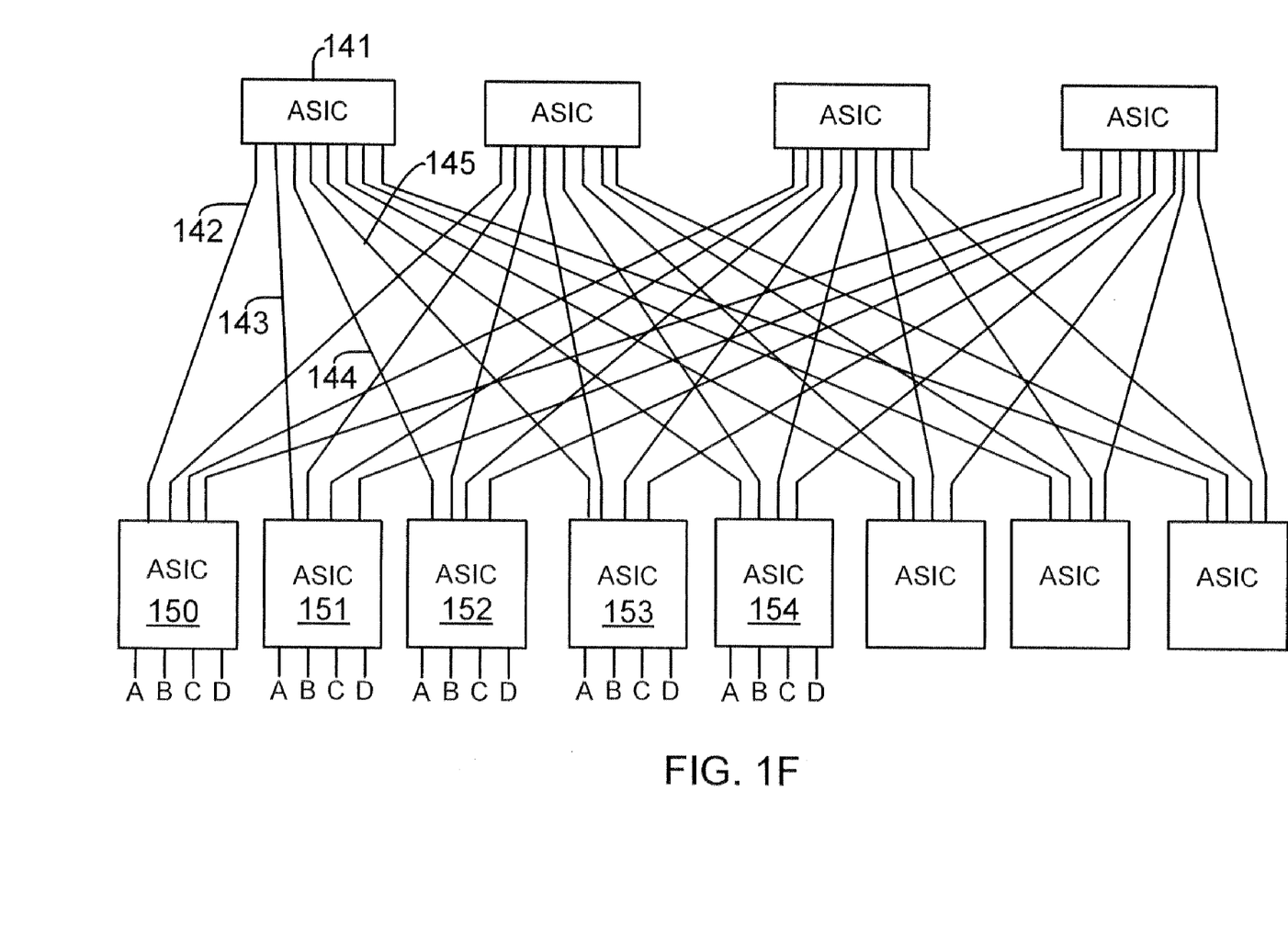
FIG. 1F shows a block diagram of a multi-level switch element using conventional routing techniques.

FIG. 1F shows an example of a Multi Level IB switch system with a plurality of Application Specific Integrated Circuits ("ASIC") (switch elements) 141, 150, 151, 152, 153 inter-connected via plural inter-switch links (ISLs) (for example, 142, 143, 144 and 145). Switch elements 150, 151, 152 and 153 are shown as having four ports A, B, C and D and the ports are referred to as 150A-150D (for ASIC 150), 151A-151D (for ASIC 151), 152A-152D (for ASIC 152), and 153A-153D (for ASIC 153). Each switch element may have any number of ports and the number of ports may not be equal.

The Uplink of ISL 142 routes packets from ASIC 150 to ASIC 141, while uplinks of ISL 144 and ISL 145 route packets from ASIC 152 and ASIC 153 to ASIC 141. The Downlink of ISL 143 routes packets from ASIC 141 to ASIC 151.

Typically, when a packet arrives at a port (150A) of an IB switch element (for example, ASIC 150), the port performs a look-up using a static routing table to determine packet destination (for example, PORT 150A to PORT 151A). In some instances, a packet is routed to one switch element via an uplink and then routed back to another switch element via another downlink. For example, a packet may be routed via the uplink of ISL 142 to switch element 141 and then routed back via the downlink of ISL 143 to switch element 151.

Static routing table based routing has disadvantages because a particular downlink may be over used ("over subscribed") by attempting to transmit multiple packets at the same time; or may be under utilized ("or under subscribed"). For example, in FIG. 1F, ASIC 141 receives packets from ASICs 150, 152 and 153 and then routes them to ASIC 151 using the downlink of ISL 143. Since the downlink of ISL 143 is used for routing packets from the foregoing ASICs, it may result in over subscription, reducing multi Level switch and overall network throughput.

Also, depending on a routing path, uplink 142 may be over subscribed. For example, uplink 142 may be over subscribed when port 150A sends packets to port 151A; port 150B sends packets to port 152A; port 150C sends packets to port 153A and port 150D sends packets to 154A.

The adaptive embodiments described herein solve this problem by holding a frame at a receive port in the first switch element and sending a tag to a destination port. The destination port processes individual tags and sends a request for the incoming frame to the receive port. It is noteworthy that the receive port and the destination port may be on different switch elements or ASICs.

Figure 2:
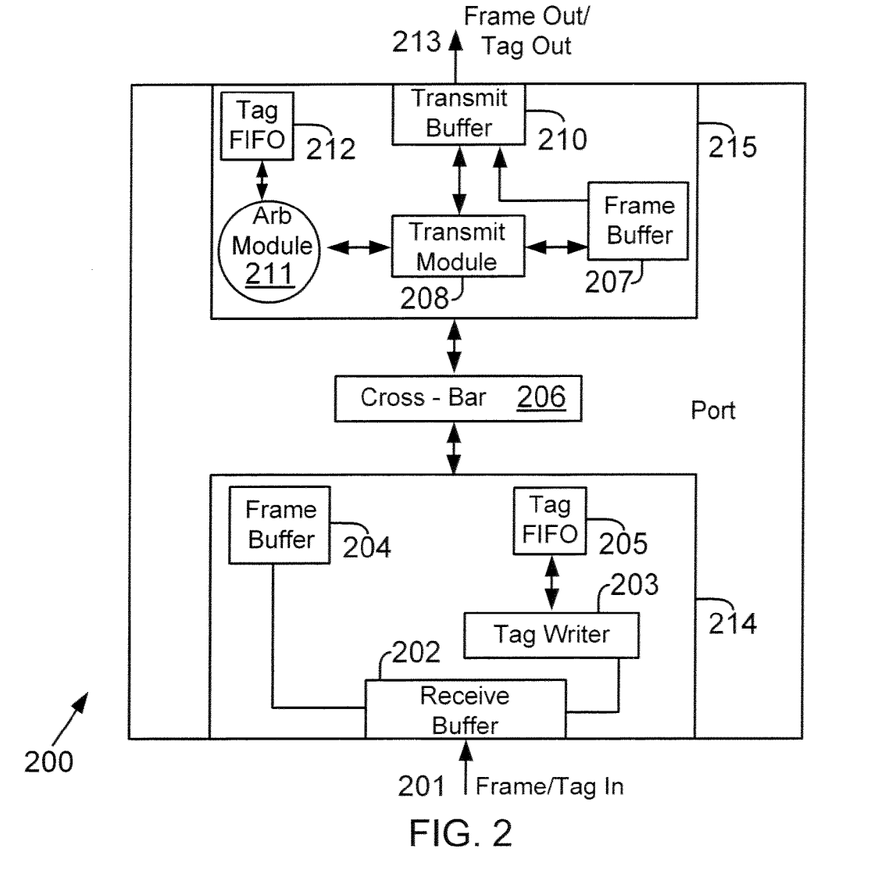
FIG. 2 shows a port structure used according to one embodiment of the present disclosure.

FIG. 2 shows a block diagram of a port structure 200, used according to one embodiment of the present disclosure. Port structure 200 includes a receive port segment (or receive port) 214 that receives and processes received frames 201 and transmit port segment (or transmit port) 215 that transmits frames and tags via link 213.

Receive port 214 receives frame in a receive buffer 202. Depending on the protocol being used, the frame source and destination information is obtained from a frame header. For example, in a Fibre Channel system, the source identifier (S_ID) field is used to identify the frame source and a destination identifier (D_ID) is used to identify a destination. After the received frames are processed, they are stored in a frame buffer 204 where the frames wait for a request from a destination port. As soon as the frames are received and processed in receive buffer 202, tag writer 203 creates a tag that is described below with respect to FIG. 3. The tag is sent to the destination port based on the destination information included in the received frame.

Memory 205 (shown as tag FIFO (first-in-first out) 205) is used to store the tags written by tag writer 203. The tags are sent to the destination port of a received frame via crossbar 206 and transmit port 215.

Transmit port 215 includes a tag FIFO 212 where received tags are staged. An arbitration module 211 receives requests for processing a tag. A tag is selected by arbitration module 211 and transmit module 208 sends the tag to its destination via transmit buffer 210. Transmit port 215 may also include a frame buffer 207 for staging frames that are sent out to their destination.

Figure 3:
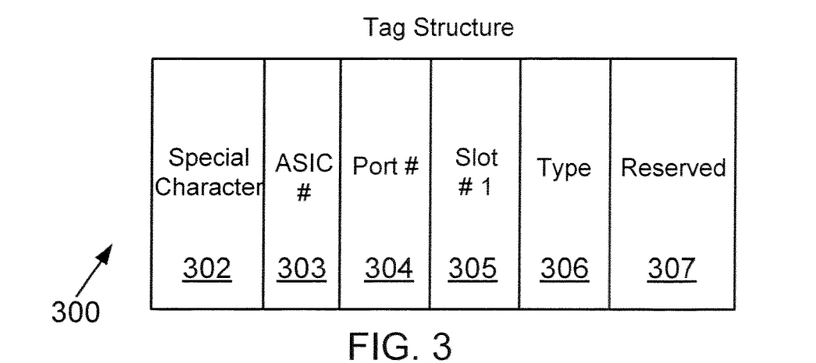
FIG. 3 shows an example of a tag structure used according to one embodiment of the present disclosure.

FIG. 3 shows a block diagram of a tag structure 300 used by tag writer 203 to create a tag for a frame (for example, 201) received from another port. Tag structure 300 includes a special character 302 that differentiates the tag from a frame. An example of such a character is the "K" character. Tag structure 300 further includes an ASIC number 303 that identifies an ASIC from where the tag is generated. Port number 304 identifies the port where a frame is received and slot number 305 identifies the location of where the frame is staged (for example, a memory slot of frame buffer 204). Type field 306 is used to identify a tag sent by a receive port, or a request for a frame sent by a destination port. For example, a bit value of 0 may identify a tag from a receive port and a bit value of 1 may identify a request from a destination port. 307 is a reserved field.

Figure 4:
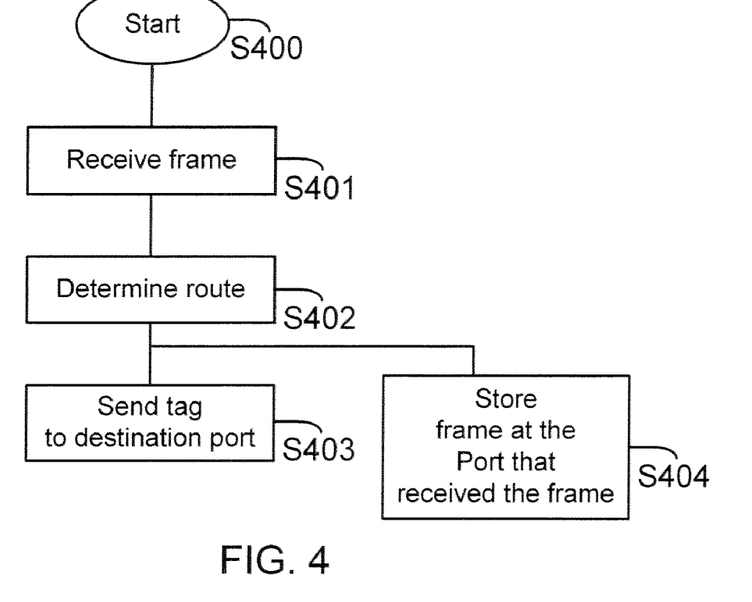
FIG. 4 shows a process flow diagram for generating a tag at a receive port, according to one embodiment of the present disclosure.

FIG. 4 shows a process flow diagram for routing frames, according to one embodiment. The process starts in step S400. In step S401, a frame is received (for example, frame 201, FIG. 2). In step S402, a route for the frame is determined. The route is determined by evaluating a destination or other fields in a frame header.

In step S403, a tag is created for the received frame and is sent to the destination port. An example of a tag structure is described above with respect to FIG. 3. Simultaneously, while the tag is being created/sent, in step S404, the received frame is stored at the receive port (for example, in frame buffer 204).

Figure 5:
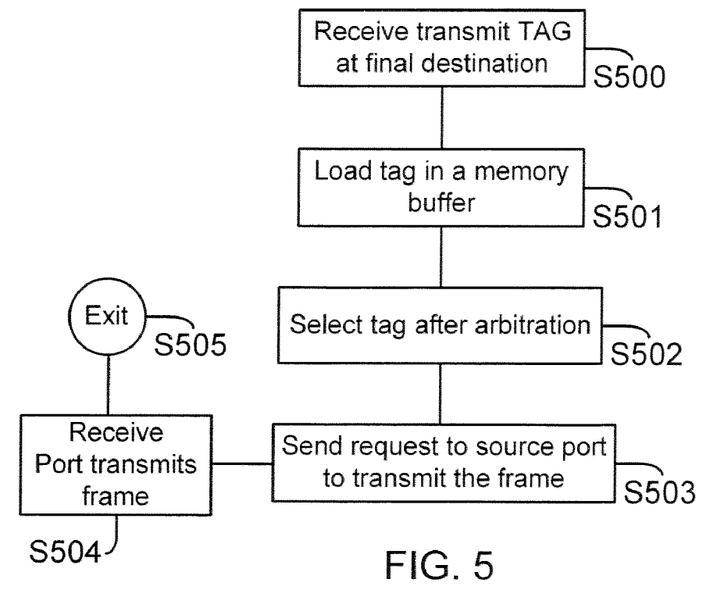
FIG. 5 shows another process flow diagram for processing a tag received at a destination port, according to one embodiment of the present disclosure.

FIG. 5 shows a process flow diagram for processing a received tag at a destination port. The process starts in step S500 when a transmit tag is received by the destination port. In step S501, the tag is stored in memory (for example, tag FIFO 212) at the destination port. In step S502, arbitration module 211 selects a tag from among a plurality of tags in tag FIFO 212. In step S503, after reading the tag, the destination port sends a request to the receive port to send the received frame.

In step S504, the port that received the frame transmits the frame to the destination port. The process ends in step S505.

This method allows efficient bandwidth utilization on links between switch elements because the use of the links is scheduled by a destination port. This prevents multiple receive ports from trying to send frames to the same destination port at the same time. With only one receive port sending a frame to a given destination at any given time, the other receive ports may send frames to other destination ports, thereby increasing the overall throughput.

Although the present disclosure has been described with reference to specific embodiments, these embodiments are illustrative only and not limiting. Many other applications and embodiments of the present disclosure will be apparent in light of this disclosure and the following claims.

What is claimed is:

1. A method for routing frames, comprising:
receiving a frame at a receive port segment of a port for a switch element having a plurality of ports, for transmission to a destination port located at a different switch element having a plurality of ports;
generating a tag based on information included in the frame, wherein the tag identifies a location where the frame is stored at the receive port segment; and wherein the tag includes a special character to distinguish the tag from the frame, a type field to differentiate between a tag sent from the receive port to the destination port and a request for the frame from the destination port; and a field that identifies an application specific integrated circuit (ASIC) from where the tag was generated;
transmitting the tag to the destination port for the frame with the type field of the tag indicative of a tag sent from the receive port;
generating a request for the frame, wherein the destination port generates the request for the frame such that the destination port controls which ports are able to send frames to the destination port, thereby preventing multiple receive ports from trying to send frames to the destination port at the same time, and the request includes the type field identifying the request for the frame from the destination port;
transmitting the generated request for the frame to the port that received the frame; and
transmitting the frame stored at the receive port segment to the destination port, in response to the generated request sent by the destination port;
wherein an arbitration module in a transmit port segment of the port that received the frame selects a tag for processing.

2. The method of claim 1, wherein the switch element is a Fibre Channel switch element and the frame is a Fibre Channel frame.

3. The method of claim 1, wherein a tag writer at the receive port segment generates a tag for the destination port.

4. The method of claim 1, wherein the frame is a non-Fibre Channel frame and the switch element is a non-Fibre Channel based switch element.

5. The method of claim 1, wherein the receive port and the destination port are on different switch elements.

6. A network system, comprising:
a first switch element including at least one port having a receive segment and a transmit segment, where the receive segment for the port receives a frame;
a second switch element with at least one port having a receive segment and a transmit segment; where the port for the second switch element is a destination port for the frame received by the first switch element port;
wherein the first switch element port generates a tag based on information included in the frame, wherein the tag identifies a location where the frame is stored in the receive port segment and wherein the tag includes a special character to distinguish the tag from the frame, a type field to differentiate between the tag sent from the port of the first switch element that received the frame to the destination port of the second switch element and a request for the flame from the destination port of the second switch element, and a field that identifies an application specific integrated circuit (ASIC) from where the tag was generated; and the transmit segment of the port for the first switch element transmits the tag to the destination port at the second switch element with the type field of the tag indicative of a tag sent from the port of the first switch element that received the frame; and
wherein the second switch element port generates a request for the frame such that the second switch element port controls which ports are able to send frames to the second switch element port, thereby preventing multiple ports from trying to send frames to the second switch element port at the same time, and the request includes the type field identifying the request for the frame from the destination port of the second switch element and transmits the generated request for the frame to the port of the first switch element that received the frame; and in response to the generated request, the first switch element port transmits the frame stored at the receive port segment of the first switch element to the destination port of the second switch element; and
wherein an arbitration module in the transmit port segment of the first switch element port selects a tag for processing.

7. The system of claim 6, wherein the first switch element and the second switch element are Fibre Channel switch elements and the received frame is a Fibre Channel frame.

8. The system of claim 6, wherein a tag writer at the receive port segment of the first switch element generates a tag for the destination port at the second switch element.

9. The system of claim 6, wherein the frame is a non-Fibre Channel frame and the switch elements are a non-Fibre Channel based switch elements.

10. A first network switch element, comprising:
at least one port having a receive segment and a transmit segment, where the receive segment for the port receives a frame, for transmission to a destination port at a second switch element; and
a tag writer for the first switch element port that generates a tag based on information included in the frame, wherein the tag identifies a location where the frame is stored in the receive port segment of the first switch element and wherein the tag includes a special character to distinguish the tag from the frame, a type field to differentiate between the tag sent from the port of the first switch element that received the frame to the destination port of the second switch element and a request for the frame from the destination port of the second switch element, and a field that identifies an application specific integrated circuit (ASIC) from where the tag was generated; and the transmit segment of the port for the first switch element transmits the tag to the destination port at a second switch element with the type field of the tag indicative of a tag sent from the port of the first switch element that received the frame;
wherein the second switch element port generates a request for the frame such that the second switch element port controls which ports are able to send frames to the second switch element port, thereby preventing multiple ports from trying to send frames to the second switch element port at the same time, and the request includes the type field identifying the request for the frame from the destination port of the second switch element and transmits the generated request for the frame to the port of the first switch element that received the frame; and in response to the generated request, the first switch element port transmits the frame stored at the receive port segment of the first switch element to the destination port of the second switch element;
wherein an arbitration module in the transmit port segment of the first switch element port selects a tag for processing.

11. The switch element of claim 10, wherein the first switch element and the second switch element are Fibre Channel switch elements and the received frame is a Fibre Channel frame.

12. The switch of claim 10, wherein the frame is a non-Fibre Channel frame and the switch elements are a non-Fibre Channel based switch elements.

13. The method of claim 1, further including selecting the tag from amongst a plurality of tags received in the destination port before generating the request for the frame from the port that sent the tag.

14. The system of claim 6, wherein the destination port of the second switch element includes an arbitration module that selects the tag from amongst a plurality of tags received in the destination port of the second switch element, before the second switch element generates the request for the frame from the port of the first switch element that received the frame.

15. The switch of claim 10, wherein the destination port of the second switch element includes an arbitration module that selects the tag from amongst a plurality of tags received in the destination port of the second switch element, before the second switch element generates the request for the frame from the port of the first switch element that received the frame.

* * * * *

UNITED STATES PATENT AND TRADEMARK OFFICE
CERTIFICATE OF CORRECTION

| | | |
|---|---|---|
| PATENT NO. | : 8,116,206 B1 | Page 1 of 1 |
| APPLICATION NO. | : 12/037847 | |
| DATED | : February 14, 2012 | |
| INVENTOR(S) | : Frank R. Dropps et al. | |

It is certified that error appears in the above-identified patent and that said Letters Patent is hereby corrected as shown below:

In column 3, line 28, delete "IF," and insert -- IP, --, therefor.

In column 3, line 61, delete "(E_Ports)" and insert -- (E_Ports). --, therefor.

In column 4, line 6, delete "integrated" and insert -- Integrated --, therefor.

In column 4, line 8, delete "20 channel" and insert -- 20-channel --, therefor.

In column 5, line 28, delete "FIGS. 1E(i)/E(ii)" and insert -- FIGS. 1E(i)/1E(ii) --, therefor.

In column 8, line 39, in Claim 6, delete "flame" and insert -- frame --, therefor.

Signed and Sealed this
Twenty-ninth Day of May, 2012

David J. Kappos
*Director of the United States Patent and Trademark Office*